United States Patent [19]
Hei et al.

[11] Patent Number: 5,858,443
[45] Date of Patent: *Jan. 12, 1999

[54] PROCESS FOR EFFECTING MICROBIAL CONTROL AND REDUCING SLIME GROWTH ON HARD SURFACES IN FOOD PROCESSING EQUIPMENT USING INLINE OZONATION

[75] Inventors: Robert D. Hei, Cottage Grove; Keith D. Lokkesmoe, Savage; Guang-jong J. Wei, Mendota Heights; Bruce R. Cords, Eagan, all of Minn.

[73] Assignee: Ecolab, Inc., St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 577,484

[22] Filed: May 13, 1996

[51] Int. Cl.⁶ .............................. A23B 1/00; A23B 1/20; A23L 1/20
[52] U.S. Cl. ...................... 426/506; 426/321; 426/330; 422/28
[58] Field of Search .............................. 252/95, 103, 135, 252/156, 173, 174.13, 174.14, 174.15, 174.16, 131, 120; 423/581; 435/262, 262.5, 267, 818, 243; 210/749, 750, 752–760, 764, 765; 422/28; 426/506, 321

[56] References Cited

U.S. PATENT DOCUMENTS

| | | | |
|---|---|---|---|
| 4,666,722 | 5/1987 | Creed et al. | 426/393 |
| 4,898,679 | 2/1990 | Siegel et al. | 210/752 |
| 4,933,411 | 6/1990 | Gifford | 426/399 |
| 5,053,140 | 10/1991 | Hurst | 210/704 |
| 5,097,556 | 3/1992 | Engel et al. | 8/158 |
| 5,114,576 | 5/1992 | Ditzler et al. | 210/195.1 |
| 5,181,399 | 1/1993 | Engel et al. | 68/13 R |
| 5,409,713 | 4/1995 | Lokkesmoe et al. | 424/616 |
| 5,484,549 | 1/1996 | Hei et al. | 252/103 |
| 5,547,584 | 8/1996 | Capehart | 210/669 |

FOREIGN PATENT DOCUMENTS

| | | |
|---|---|---|
| 0 541 076 A2 | 5/1993 | European Pat. Off. |
| 0 589 707 A1 | 3/1994 | European Pat. Off. |
| 32 09 930 | 9/1983 | Germany |
| 39 17 250 | 12/1990 | Germany |
| 62-61574 | 3/1987 | Japan |
| 64-51071 | 2/1989 | Japan |
| 2-172593 | 7/1990 | Japan |
| 3-217294 | 9/1991 | Japan |
| 3-249985 | 11/1991 | Japan |
| 4-145997 | 5/1992 | Japan |
| 677 226 | 4/1991 | Switzerland |
| 858735 | 8/1981 | U.S.S.R. |
| WO 96 034449 A | 2/1996 | WIPO |

OTHER PUBLICATIONS

*Industries Alimentaires et Agricoles*, 1978, 95 (9/10), pp. 1089–1091, Paragraph 1.2.1 Ozone (English Translation attached).

"Surface Disinfection of Raw Produce", *Dairy, Food and Environmental Sanitation*, Larry R. Beuchat, vol. 12, No. 1, pp. 6–9 (Jan. 1992).

"Effect of Ozonated Water on Postharvest Pathogens of Pear in Laboratory and Packinghouse Tests", *Plant Disease*, R. A. Spotts et al., vol. 76, No. 3, pp. 256–259 (Mar., 1992).

"Ozone as a disinfectant in process plant", *Food Control*, T. R. Bott, pp. 44–49 (Jan., 1991).

*Primary Examiner*—Marian C. Knode
*Assistant Examiner*—Ali Salimi
*Attorney, Agent, or Firm*—Merchant, Gould, Smith, Edell, Welter & Schmidt, P.A.

[57] ABSTRACT

The invention relates to treatment of aqueous streams and aqueous systems with ozone. The aqueous stream comprises a closed loop system providing transport from a production locus to a processing locus for a variety of products. The aqueous stream can contain a challenge soil load and a microbial load. A treatment zone is defined through which the aqueous stream passes. The treatment zone is contacted with a sufficient concentration of ozone to substantially reduce the microbial population and to substantially reduce the number of microorganisms that can generate slime on the interior of the system. An amount of ozone is added to the aqueous stream in the treatment zone such that once the microbial populations are reduced to a safe level, the ozone concentration is also reduced to a level substantially safe for contact with operating personnel and product. Typically, such concentration is less than one part by weight of ozone per million parts by weight of aqueous system, preferably less than 0.5 parts by weight of ozone per million parts of aqueous system. The use of a treatment zone in an aqueous system segregates the ozone from release into areas frequented by operating personnel, sensitive materials or product.

20 Claims, 8 Drawing Sheets

PROCESS FOR EFFECTING MICROBIAL CONTROL AND REDUCING SLIME GROWTH ON HARD SURFACES IN FOOD PROCESSING EQUIPMENT USING INLINE OZONATION

FIELD OF THE INVENTION

The invention relates to the control of a microbial population and to the use of an antimicrobial composition in an aqueous system or stream containing a challenge soil load comprising a food, a food particulate, soil and microorganisms. The invention also relates to the treatment of aqueous systems with a composition that reduces microbial population and in particular to systems that reduce the population of slime generating microorganisms. More specifically, the invention relates to the use of antimicrobial oxidant in a separate treatment zone to reduce microbial populations in a small portion of the aqueous flow containing a challenge soil load.

BACKGROUND OF THE INVENTION

Water has been used as a transportation medium in moving a product from a production locus to a processing or use locus for many years. A variety of materials can be made to float or become suspended or dissolved in water have been transported using a moving aqueous stream. have been transported using a moving aqueous stream. Examples of such materials include products of the lumber industry, coal in a coal slurry, agricultural products such as fruits and vegetables, particulate products of aqueous polymerization, and others too numerous to mention. One consistent design characteristic of these systems is the use of a closed loop aqueous stream returning the aqueous medium to its origin. The aqueous stream that transports the material from a production locus to a processing locus is often returned, without product, to the production locus for new product for transport. Such recycled water streams that are continually reused acquire a soil load that can support the growth of microbial populations and in particular slime producing microorganisms. Such closed flow water systems can obtain and accumulate substantial concentrations of impurities from the environment and from the product transported in the closed loop system. Such a challenge soil load can pose even more substantial problems in the instance that the product is of biological origin including products such as wood, wood fiber, fruits, vegetables, etc. or other products comprising substantial quantities of carbohydrate, lipid or proteinaceous compositions that can act as a food source for microorganisms. A need for effective antimicrobial agents and processes is apparent to prevent or reduce microbial populations.

Ideally, an antimicrobial agent or compound used in such a system will have several important properties in addition to its antimicrobial efficacy. The compound or agent should have no residual antimicrobial activity on the food after processing. Residual activity implies the presence of a film of antimicrobial material which will continue to have antimicrobial effect which may require further rinsing of the food product. The antimicrobial agent preferably should also be odor free to prevent transfer of undesirable odors onto food stuffs. The antimicrobial agent should also be composed of direct food additive materials which will not effect food if contamination occurs, nor effect humans should incidental ingestion result. In addition, the antimicrobial agent should preferably be composed of, or should result in naturally occurring or innocuous ingredients, which are chemically compatible with the environment and cause no concerns for toxic residues within the flume water.

One common aqueous transport system comprises a flume system. Such systems are used in agriculture to transport an agricultural product such as fruits or vegetables from a production locus, typically a farm field or garden plot to a processing locus, for washing and packing using an aqueous stream. The fruits or vegetables are cleaned, treated and packed for distribution at the processing locus. Such flume systems can contain large volumes of water flowing at a rate of about 20 to 4000 liters per minute. Such flume systems can transport substantial quantities of fruits or vegetables from a production locus to a processing locus. Such systems can transport about 10 to 1000 pounds of fruits or vegetables per minute or more, on a continuous basis during production operations. Such flume streams inherently become contaminated with soil, fruit and vegetable fragments, plant fragments, and other agricultural by-products. Such a flume stream is a potent medium for promoting the growth of microorganisms. Untreated flume water can rapidly become contaminated with large microbial populations. As a result of the growth of slime forming microorganisms, the surfaces of the aqueous system can rapidly be coated with slime producing colonies and the slime by-product.

The challenge soil load can comprise a substantial proportion of the aqueous stream, commonly about 0.1 to 20 wt. % of the aqueous stream, most commonly about 1–15 wt. % of the aqueous stream.

The most common treatment to reduce the populations of such microorganisms comprises contacting the flume stream, at any arbitrary position in the closed loop, with chlorine ($Cl_2$) or a chlorine containing or yielding antimicrobial composition. Such antimicrobials include chlorine gas ($Cl_2$), chlorine dioxide ($ClO_2$) sodium hypochlorite (NaOCl), chlorinated isocyanurate compounds or other chlorinated compounds that can generate a sanitizing or antimicrobial concentration of chlorine in the aqueous stream. Chlorine is a well known antimicrobial material and is often very effective in controlling microbial growth. However, the use of such chlorinating materials often has substantial drawbacks including equipment corrosion and hazard to operating personnel. The use rate of these chlorine-based antimicrobials is very high because they tend to be rapidly consumed by the high organic load in the aqueous stream. Further, upon consumption, compounds such as chlorine gas or chlorine dioxide decompose producing byproducts such as chlorites and chlorates, while hypochlorite produces trichloromethanes which may be toxic in very low concentrations. Lastly, chlorine dioxide is a toxic gas with an acceptable air concentration limit of 0.1 ppm. Exposure to $ClO_2$ often leads to headaches, nausea, and respiratory problems, requiring expensive and intricate safety devices and equipment when it is used.

Iodophor antimicrobial agents have also been used for various aqueous antimicrobial applications. However, iodophor compounds tend to decompose or may be lost by evaporation when used in an aqueous medium. Thus, long term activity requires a high iodophor concentration.

As a result, a substantial need exists in the food processing industry to provide a means of food transport which also controls microbial soil load without the use of high concentrations of antimicrobials such as chlorine yielding compounds or other halogenated constituents.

A number of attempts have been made to rectify the problems caused by chlorinating substances in such materials. One attempt relates to the use of peracetic materials in flume water. Lokkesmoe et al., U.S. Pat. No. 5,409,713 teach the use of peracetic acid in an antimicrobial role in treating flume water. The use of other antimicrobial agents in the control of microorganisms is well known for various applications. For example, Grosse Böwing et al., U.S. Pat. Nos. 4,051,058 and 4,051,059 use peracetic acid as a food grade sanitizer in a variety of applications. Further, Greenspan et al., U.S. Pat. No. 2,512,640 teach the use of a peracetic acid composition comprising 500 ppm or more of peracetic acid for the treatment of various fruit and vegetable compositions in a spray applicator. Greenspan et al., Food Technology, Vol. 5, No. 3, 1951, similarly discloses spray compositions which may be applied to fresh fruits and vegetables comprising peracetic acid. Langford, U.K. Patent Application GE 2 187 958 A discloses the use of peracetic acid and propionic acid for the treatment of fungi in microbial plant pathogens on growing plants and especially edible crops. In other publications, Baldry et al., "Disinfection of Sewage Effluent with Peracetic Acid", Wat. Sci. Tech., Vol. 21, No. 3, pp. 203–206, 1989; and Poffe et al., "Disinfection of Effluents from Municipal Sewage Treatment Plants with Peroxy Acids", Zbl. Bakt. Hyg. I. Abt. Orig. B 167, 337–346 (1978) both disclose the use of peroxy acids for the treatment of effluents streams and municipal sewage applications. Hutchings et al., "Comparative Evaluation of the Bactericidal Efficiency of Peracetic Acid, Quaternaries, and Chlorine-Containing Compounds", Society of American Bacteriologists, Abstracts of Papers Presented at the 49th General Meeting, discloses the generally efficacy of peracetic acid compared to various other antimicrobial compounds. Additionally, Branner-Jorgensen et al., U.S. Pat. No. 4,591,565 discloses the reduction of the thermal stability of rennet through the use of aqueous-based aliphatic or inorganic peroxy acids. Block, "Disinfection, Sterilization, and Preservation", Fourth Edition, Chapter 9, pages 167–181, discloses the various characteristics and attributes of peroxygen compounds. However, generally the art has taught against the use of percarboxylic acids in aqueous streams due to concerns of compound stability in the presence of high concentrations of organic matter.

Hurst, U.S. Pat. No. 5,053,140 teaches a water treatment installation designed to remove solids, fat, bacteria and other impurities from water used in food processing. Bulk water is subjected to a number of purification steps including a countercurrent contact with a stream of ozone. Abiko, Japanese Patent Application Kokai No. 4-145997 teaches a similar purification unit. Avvakumov et al., U.S.S.R. Inventor Certificate No. 858735 and other patents teach the addition of ozone to fresh water input, or to clean make up water, to a food processing area or directly to the flume water transport area. Such schemes maintain a relatively high concentration of ozone in the bulk transportation water during movement of product from production locus to use locus. Beuchat, "Surface Disinfection of Raw Produce", *Dairy Food and Environmental Sanitation,* Vol. 12, No. 1, and other references teaches the use of the direct application of gaseous or aqueous ozone to bulk water to obtain microbial population control. T. R. Bott, "Ozone as a disinfectant in process plant", *Food Control,* generally discusses the use of ozone in general disinfectant applications. As a whole, Bott teaches the direct application of relatively small concentrations of ozone against surfaces for disinfecting and cleaning. Bott suggests relatively clean water with reduced ozone concentrations (about 0.1 ppm) for control. Sumi, JP 60-202229 and Shieno, JP 62-206536 contact food with preozonized aqueous solutions to effect microbial control. Shieno teaches a food sterilization method using preozonated solutions to affect microbial control in a system using circulated water that has no challenge load comprising microorganisms or soil. Shieno uses ozone with organic adjuvants having a relatively corrosive 3–5 pH. Lastly, Shieno apparently does not use a circulated/recirculated system. Sumi et al. teach a food washing, sanitizing device wherein ozone is dispersed into an open tank containing bulk water, i.e. greater than 50 wt. % of the service water. The treatment of the bulk water is done in an open container. Because of the disagreeable/toxic nature of ozone, contacting any food, or contacting a processing surface or an aqueous stream with ozone can cause worker discomfort or other problems. Further, attempts to treat large volumes of aqueous streams require substantial ozone generating equipment.

Typical commercial applications described for flume systems attempt microbial control using ozone applications into relatively clean, bulk—usually potable—make-up or filling waters. Other processes involve direct food contact between food and ozone. All of these applications are based on the premise that high demand, soiled waters will generally reduce or eliminate the ozone concentration and make ozone ineffective in high demand soiled waters for microbial control. Because of this concern that large concentrations of challenged soil load will prevent microbial control using ozone, the prior art has focused on treating clean water with ozone at or near the introduction of the make-up water into the flume system. These approaches result in potential ozone off gassing which can create hazard for operating personnel or equipment corrosion. Further, ozone in direct contact with food material can degrade the appearance or nutritive quality of the food. Further, these processes require relatively large consumption of ozone in such systems to maintain a high residual ozone concentration for effective microbial kill. Typically, an ozone residual goal of between 0.1–10 ppm ozone in water is required.

Accordingly, a substantial need exists for treatment systems that can effectively utilize ozone to control microbial populations without any direct contact of significant concentrates (greater than 1 ppm of ozone with large volumes of processing water, food articles, processing surfaces of the general environment surrounding the processing facilities. However, the use of ozone must successfully reduce microbial populations while not causing significant corrosion or other chemical attack on production facilities.

BRIEF DISCUSSION OF THE INVENTION

We have discovered that microbial control can be achieved in a variety of closed cycle aqueous processing systems if a fixed small proportion of the aqueous recycle containing a challenge soil load stream is directed, on a continuous flow basis, through a treatment zone for contact with ozone. Within the treatment zone, the aqueous stream is contacted with a high concentration of ozone. The ozone reacts with food particulate, soil and the microbial population in the challenge soil load. As the ozone reacts with the load and reduces the microbial population , the ozone concentration is also reduced in proportion. An amount of ozone is used such that after treatment the concentration of ozone in the stream exiting the zone is not noxious, irritating or harmful. Preferably the ozone concentration is reduced to a concentration that prevents off gassing or other undesirable ozone related effects, typically to less than 1 ppm, preferably less that 0.1 ppm $O_3$ in water. After treatment is complete, the continuous aqueous flow exits the treatment zone having reduced microbial populations and substantially reduced ozone concentrations. During processing, the aqueous ozone concentration can range from greater than one to about 50 ppm. However, upon exit from the treatment zone, the ozone concentration is typically less than 1 ppm and can be as small as 0.1 ppm depending on process conditions. Using a treatment zone, ozone is confined to a small volume of the aqueous stream wherein the aqueous stream is exposed to significant concentrations of ozone that can substantially remove all microbes from the stream. The processing equipment, other than the treatment zone, is not contacted with ozone in any substantial concentration. Additionally, no product transported using the aqueous stream comes into direct contact with substantial quantities of ozone. Further, no production personnel, in contact with the aqueous stream, transported product or associated equipment, contacts active ozone in any significant concentration during operations.

The invention involves treating moderate to high demand recycled waters containing substantial quantities of a challenge soil load comprising dissolved soil, food, bacteria and other microbes (the challenge soil load comprising up to 10 wt. % in the flume water stream but typically between 0.1–3 wt. %) to effect microbial reduction or elimination. This process utilizes a localized, short contact time, high ozone content treatment zone. Even in a high demand system with appreciable food and other challenged soil, the use of ozone at an effective concentration can effectively kill microorganisms and reduce such populations. The amount of ozone contacted in the treatment zone is dependent on the content of the challenged soil. An amount of ozone is selected such that the ozone reacts with the microbial populations and the balance of the challenged soil load such that the concentration of ozone is less than about 0.1 ppm just before leaving the treatment zone. We believe that utilizing the process of this invention, that the problems related to using ozone in clean potable make-up water can be avoided and the consumption of ozone can be substantially reduced while still obtaining effective microbial control. We believe that the ozone consumption can be reduced two to ten-fold over prior art ozone systems. The process of the invention is unexpectedly effective in preventing the growth of unwanted microorganisms in food transport apparatus. The consumption of ozone is unexpectedly low in view of the organic loading of both fruits or vegetables and microbial soils within the flume water. The process of the invention provides an antimicrobial agent useful in process water for transporting food products which has a high degree of antimicrobial efficacy and which is safely ingestible by humans while imposing no environmental incompatibility.

Differentiation of antimicrobial "-cidal" or "-static" activity, the definitions which describe the degree of efficacy, and the official laboratory protocols for measuring this efficacy are important considerations for understanding the relevance of antimicrobial agents and compositions. Antimicrobial compositions may effect two kinds of microbial cell damage. The first is a truly lethal, irreversible action resulting in complete microbial cell destruction or incapacitation. The second type of cell damage is reversible, such that if the organism is rendered free or the agent, it can again multiply. The former is termed bacteriocidal and the later, bacteriostatic. A sanitizer and a disinfectant are, by definition, agents which provide antibacterial or bacteriocidal activity. In contrast, a preservative is generally described as an inhibitor or bacteriostatic composition. For the purpose of this invention, the term "challenge soil load" means material dissolved or suspended in an aqueous stream. Such material can comprise food particulate, food residue, agricultural soil, microbial spores, organisms, cell walls, and other microbial components and by-products. The term "treatment zone" means a batch or continuously operating conduit or container having a volume of less than 10 vol. % of the total aqueous stream, preferably less than 1% of the total aqueous stream wherein the aqueous stream containing a challenge soil load is contacted with ozone in gas or aqueous phase. In a treatment zone, the ozone is maintained in a closed container or conduit until substantially consumed during its use as a microbial control agent. Using such a treatment zone, little free ozone is released from the aqueous stream because it is substantially completely consumed during contact with the challenge soil load in the treatment zone. The treatment zone typically comprises a closed volume preventing loss of ozone from the aqueous stream into the atmosphere. Further, the treatment zone can contain means to introduce ozone into the aqueous stream in gaseous, aqueous or mixed aqueous gaseous phase. Lastly, the treatment zone can contain means to agitate the ozonated water, the aqueous stream and the challenge soil load to effect appropriate contact between ozone and microbes or microbe generating constituents.

DETAILED DESCRIPTION OF THE INVENTION

Figure 1:
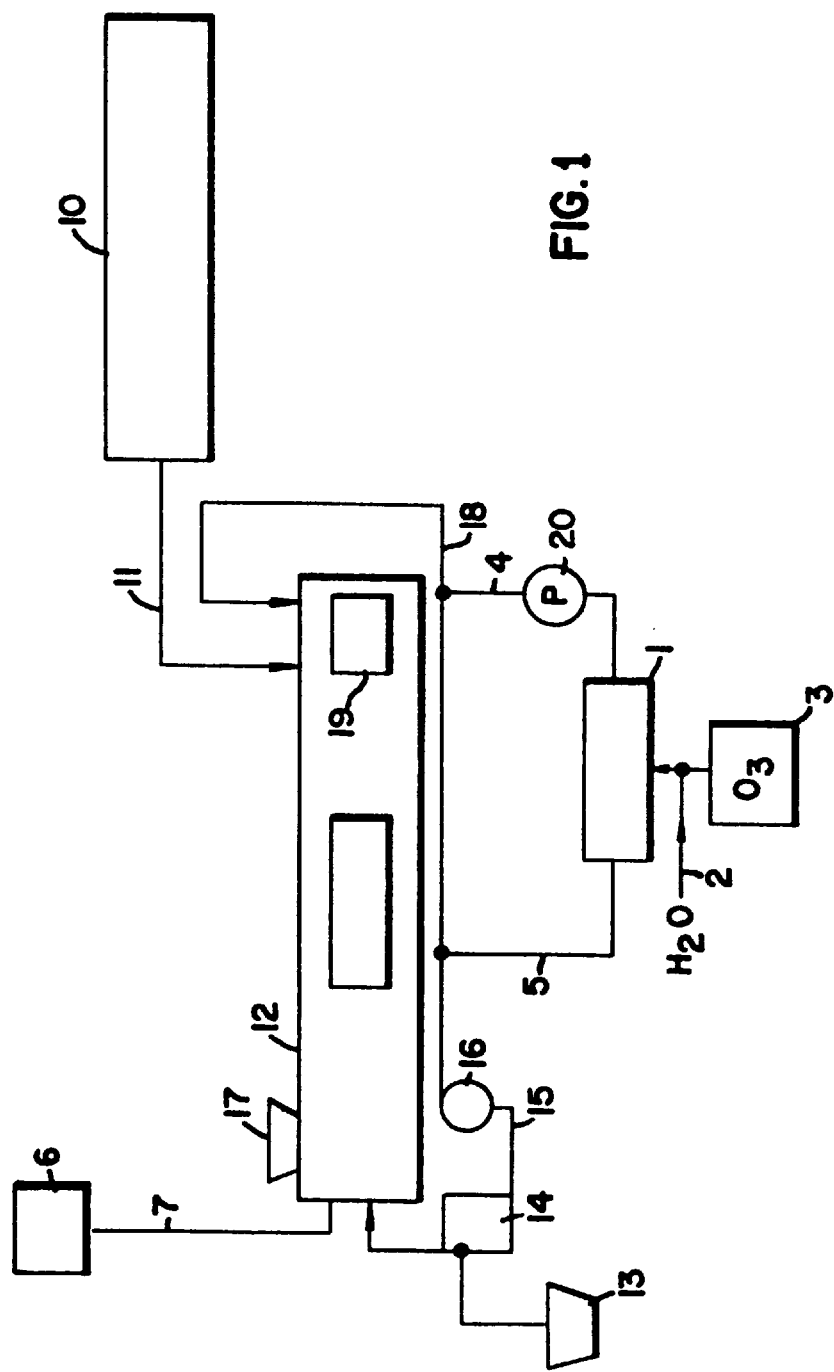
FIG. 1 is a block diagram representation of a flume system. This diagram is generally representative of flume systems. However, a variety of flume systems appear in different configurations.

The process of this invention involves contacting an aqueous stream containing a challenge soil load containing microbes or microbial generating colonies with an effective concentration of ozone in a treatment zone. Within the treatment zone, the ozone reacts to substantially destroy microbial populations. Additionally, the concentration of ozone is reduced in the treatment zone to less than 1, preferably substantially less than 0.1 ppm of ozone in the aqueous stream.

TREATMENT MODE

In the process of the invention the aqueous stream that is directed into the treatment zone can be obtained from substantially any portion of the flume system having an aqueous stream with a challenge soil load. Preferably, the aqueous stream does not contain whole product. The aqueous stream preferably is derived after product is removed from the aqueous stream during recycle to a production locus. Soiled water can be obtained from the water transport zone of a flume system in such a way that product is not removed from this flume system for transport into the treatment zone. Recycle water can be diverted from a recycle line into the treatment zone after food product has been removed. Water in temporary storage tanks or overflow tanks containing a substantial soil load can be diverted into the treatment zone for treatment. Such water materials can be obtained from water chill or equipment, holding tanks, sediment chambers, bulk scrubbing systems, etc. The basic requirements of the system is that the aqueous stream contains some challenge soil load. The presence of the soil load permits the operators to contact the aqueous stream with ozone resulting in both the substantial kill of microorganisms and the reduction of ozone concentration in the treatment zone before the aqueous stream exits the treatment zone for reuse. The amount of ozone added to the treatment zone can be easily calculated from challenge soil load concentration. However, proportions of challenge soil load and preferred concentration of ozone is discussed below.

OZONE

Ozone cannot be easily stored or shipped. Ozone is typically generated on site and is dissolved into aqueous media at a use locus just prior to use. The half life of ozone in neutral solutions is about 3–10 minutes and less as pH increases. Weak concentrations of ozone may be generated using ultraviolet radiation. Typical production of ozone is made using electrical corona discharge. The process involves obtaining a source of oxygen in a pure form of 021 generally atmospheric oxygen (or enriched air) containing greater than about 21 volume % oxygen. The source of oxygen is passed between electrodes across which a high voltage alternating potential is maintained. The potential is established across the electrodes which are configured to prevent arching. As oxygen molecules enter the area of potential, a corona is created having a proportion of free atomic oxygens dissociated from an oxygen molecule ($O_2$) The high energy atomic ion (O) when combined with oxygen ($O_2$) form a mixture of oxygen and ozone ($O_3$). These generators are available commercially. The ozone containing aqueous mixture is generally contacted with an aqueous solution through bubbling or other gas dispersion techniques to introduce an antimicrobial concentration of ozone into the aqueous medium. The contact between ozone and the aqueous medium is then engineered to maximize the absorption of ozone when compared to the rate of decomposition of ozone in the alkaline aqueous medium and the required ozone concentration in the water.

The activity of ozone in the aqueous medium of the invention can be improved by introducing ozone into the smallest possible diameter bubble formation. Small bubbles promote the dissolution of ozone into the bulk aqueous solution. Additionally, surface active agents which lower the gas liquid interfacial tension can be used to enhance ozone gas transport to the aqueous medium. Rapid dissolution of ozone can reduce the tendency to off gas into the atmosphere, and cause reactions with solution components to produce oxidized species and promote the effective use of ozone. Ozonized solutions can contain ozone in increasing proportions as temperatures decrease. 60° C. aqueous solutions are rapidly depleted of ozone by off gassing. In sharp contrast, aqueous media at 0° C. can contain a fairly constant proportion of ozone at about 35 ppm.

The stability of ozone in aqueous solutions decreases as alkalinity increases. The half life of ozone in 1 $\underline{N}$ sodium hydroxide is less than 10 seconds. For the purpose of the invention involving concentrations of ozone in aqueous solution, the term "total ozone" relates to the amount of ozone added to the aqueous phase from the gas phase. Typically these total ozone levels in the gas phase range from about 1 to about 1000 parts of ozone to one million parts of total aqueous phase. Measured ozone is the apparent concentration of ozone (as $O_3$) in aqueous solution. The difference between total ozone and measured ozone relates to the amount of ozone that apparently becomes stored in aqueous solution by reaction with organic and inorganic species to form ozonized or oxidized materials which can be a source of oxidizing potential.

ADJUVANTS

The ozone process of the invention is designed to operate efficiently to reduce microbial populations without the use of other antimicrobial materials. However, certain adjuvants having little or no antimicrobial efficacy alone, can be used in combination with the ozone to increase ozone effectiveness.

The antimicrobial composition of the invention may also comprise any number of adjuvants. Specifically, the composition of the invention may comprise stabilizing agents, wetting agents, as well as pigments or dyes among any number of constituents which may be added to the composition.

Stabilizing agents may be added to the composition of the invention to stabilize the aqueous ozone solutions. Chelating agents or sequestrants generally useful if stabilizing agents in the invention include alkyl diamine polyacetic acid-type chelating agents such as EDTA (ethylene diamine tetraacetate tetrasodium salt), acrylic and polyacrylic acid-type stabilizing agents, phosphonic acid, and phosphonate-type chelating agents among others. Preferable sequestrants include phosphonic acids and phosphonate salts including 1-hydroxy ethylene-1, 1-diphosphonic acid ($CH_3C(PO_3H_2)_2OH$), amino[tri(methylene phosphonic acid)] ($[CH_2PO_3H_2]_2$(ethylene diamine[tetra methylene-phosphonic acid)], 2-phosphene butane-1, 2, 4-tricarboxylic acid, as well as the alkyl metal salts, ammonium salts, or alkyloyl amine salts, such as mono, di, or tetra-ethanolamine salts. The stabilizing agent is used in a concentration ranging from about 0 weight percent to about 20 weight percent of the composition, preferably from about 0.1 weight percent to about 10 weight percent of the composition, and most preferably from about 0.2 weight percent to 5 weight percent of the composition.

Also useful in the composition of the invention are wetting and defoaming agents. Wetting agents function to increase the penetration activity of the antimicrobial composition of the invention. Wetting agents which may be used in the composition of the invention include any of those constituents known within the art to raise the surface activity of the composition of the invention.

Along these lines surfactants, and especially nonionic surfactants, may also be useful in the present invention. Nonionic surfactants which may be useful in the present invention are those which comprise ethylene oxide moieties, propylene oxide moieties, as well a mixtures thereof, and ethylene oxide-propylene oxide moieties in either heteric or block formation. Additionally useful in the present invention are nonionic surfactants which comprise an alkyl ethylene oxide compounds, alkyl propylene oxide compounds, as well as mixtures thereof, and alkyl ethylene oxidepropylene oxide compounds where the ethylene oxide propylene oxide moiety is either in heteric or block formation. Further useful in the present invention are nonionic surfactants having any mixture or combination of ethylene oxide-propylene oxide moieties linked to a alkyl chain where the ethylene oxide and propylene oxide moieties may be in any randomized or ordered pattern and of any specific length. Nonionic surfactants useful in the present invention may also comprise randomized sections of block and heteric ethylene oxide propylene oxide, or ethylene oxide-propylene oxide.

Generally, the concentration of nonionic surfactant used in the invention may range from about 0 wt. % to about 5 wt. % of the composition, preferably from about 0.01 wt. % to about 2 wt. % of the concentrate composition, and most preferably from about 0.01 wt. % to about 1 wt. % of the composition.

The composition used in the process of the invention may also contain additional ingredients as necessary to assist in defoaming.

Generally, defoamers which may be used in accordance with the invention include silica and silicones; aliphatic acids or esters; alcohols; sulfates or sulfonates; amines or amides; halogenated compounds such as fluorochlorohydrocarbons; vegetable oils, waxes, mineral oils as well as their sulfated derivatives; fatty acid soaps such as alkali, alkaline earth metal soaps; and phosphates and phosphate esters such as alkyl and alkaline diphosphates, and tributyl phosphates among others; and mixtures thereof.

Especially preferable, are those antifoaming agents or defoamers which are of food grade quality given the application of the process of the invention. To this end, one of the more effective antifoaming agents comprises silicones. Silicones such as dimethyl silicone, glycol polysiloxane, methylphenol polysiloxane, trialkyl or tetralkyl silanes, hydrophobic silica defoamers and mixtures thereof may all be used in defoaming applications. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200™ from Dow Corning Corporation which are both food grade type silicones among others. These defoamers are generally present at a concentration range from about 0 wt. % to 5 wt. %, preferably from about 0 wt. % to 2 wt. %, and most preferably from about 0 wt. % to about 1 wt. %.

The invention may also contain any number of other constituents as necessitated by the application, which are known to those of skill in the art and which may facilitate the activity of the present invention.

DETAILED DESCRIPTION OF DRAWING

Working flume systems typically comprise a station for introducing product into a water transport flow which transports the product from a production locus to a processing locus. The product is removed from the water flow at the production locus, processed and sold. The transport water is then returned to the production locus for reuse.

In somewhat greater detail, FIG. 1 shows one representation of an embodiment of the flume apparatus using a treatment zone 1 supplied by a source of ozone 3. In the operation of the flume, a product is introduced into the aqueous stream at port 17. In the flume 12, the produce is transported along the length of the flume from port 17 to exit 19. At exit 19, product is removed from the flume for further processing. When the flume operations are initiated, fill water is provided from a source of potable or service water 6 through line 7. During operation, the flume water level can be maintained using water derived from tank 10 through fill line 11. Water from the flume is recycled through line 18 to the production port 17. Water in line 18 is pumped using pump 16 through line 15 into pump tank 14 for reuse in the flume system. Overflow from the tank can be discarded through discharge pipe or conduit 13. In the operation of the process of this invention, transport water from the flume can be diverted from operations into the treatment zone from any portion of the flume transport water recycle or make-up. In such treatment operations, a relatively small volume of the total flume water typically about 20 vol. %, less than about 10%, preferably less than 5%, and as little as 1% or 0.5 volume % can be treated on a continuous basis in the treatment zone. The treatment zone can be sized to contain the volume to be treated. Preferably, the process of the invention is operated on a continuous flow through basis wherein the treatment zone has a fixed volume. Alternatively, the process of the invention can be run on a batch mode by filling a batch tank with water sampled from any portion of the flume operations. In the batch tank, the materials can be contacted with ozone for the purpose of contacting the water with a challenge soil load for the purpose of reducing microbial population. Once treated and after the ozone concentration is reduced, the water can be pumped from the batch tank back to the flume apparatus, the make-up tank or any other volume or stream of water in the flume operations.

In the preferred continuous flow mode of the invention, a continuous stream of flume water containing the characteristic challenge soil load flows into a treatment zone for contact with either gaseous or aqueous ozone. FIG. 1 shows a line 4 with an in-line pump 20 transporting flume water from recycle line 18 into the treatment zone 1. Within the treatment zone, the flume water is treated with ozone. Ozone is typically generated in an ozone generator 3. Such generators are commercially available.

One method of ozone treatment involves direct injection of ozone gas, from the ozone generator 3, into the treatment zone 1 where gas is contacted with the aqueous challenge soil load. The treatment zone 1 might contain pumps, static mixers, or other mechanical aids to effect efficient gas contact and transport into the liquid phase. This method tends to yield the greatest microbial kill in the load. With this method, no additional water would be supplied through line 2. Alternately, a second method is where water is supplied through a supply line 2 and contacted with ozone under conditions to maximize the concentration of ozone in the water. Typically potable water at commonly neutral pH's are used at relatively low temperature less than 70° F., preferably 32°–65° F., to maintain high ozone concentrations relatively. Ozone is contacted with water under mixing conditions using small ozone bubbles and high agitation rates to obtain transfer of ozone to gaseous to aqueous phase. Ozonated water is added to the flume water at sufficient proportions to form sufficient ozone to reduce microbial populations in the flume water to levels that will help in controlling microbial growth throughout the flume system. Typically, a 2–3 log reduction in microbial levels should accomplish this control. Preferably the treated flume water has no capacity to form a new microbial population or colony after treatment. However, some small proportion of microbes may continue to exist in the treated water.

Figure 2:
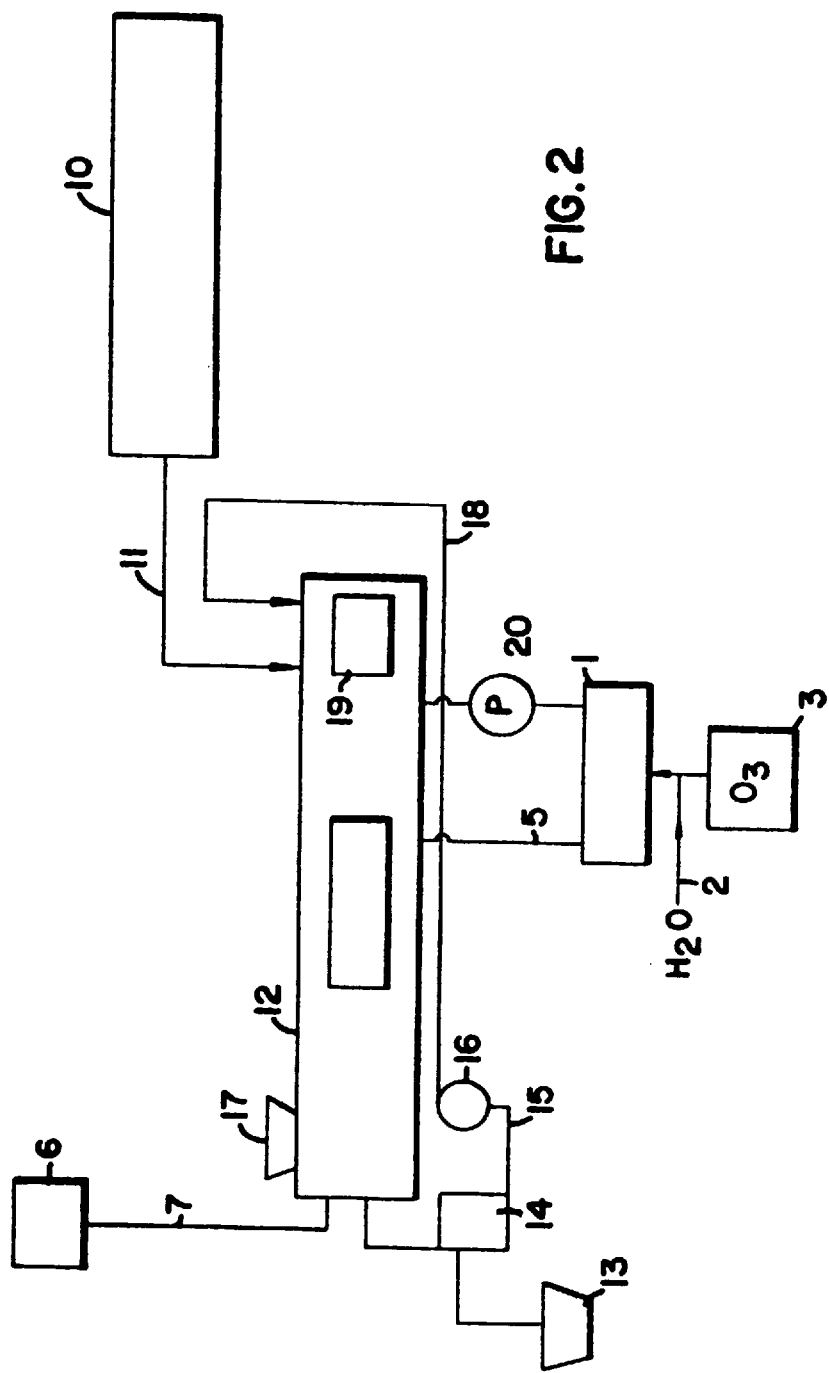
FIG. 2 is a block diagram representation of a second flume system. This diagram is generally representative of a flume system with a different type of treatment zone arrangement for treating an aqueous stream derived from another portion of the flume apparatus.

FIG. 2 is similar to FIG. 1 except that flume water is obtained directly from the flume unit. Flume water containing the characteristic soil load is obtained from the processing end 19 of the flume. Such water is delivered via pump 20 through line 4 into the treatment zone line 1. After treatment is complete, the treated flume water is returned to the flume apparatus at any convenient point. Again, ozonation of the flume water 4 can be by direct injection of ozone gas into the treatment zone 1, from the ozone generator 3, without additional water from supply line 2; or, by ozonation of the water from supply line 2, and this ozonated water mixed with the flume water delivered through line 4. In FIG. 2 the treated water is returned to the flume transport stream in line 5.

In a continuous flow system, ozone or ozonated water is typically introduced into the treatment zone at or near the site of flume water input from the system. Immediate and intimate contact between the flume water with its characteristic soil load and the ozone or ozonated water ensures that the volume of flume water is sufficiently and adequately treated to reduce microbial populations prior to exit of the flume water from the treatment zone. Additionally, maintaining close and intimate contact between ozone and the flume water in the treatment zone ensures that the flume water, upon exit, has a substantially reduced ozone concentration and can be safely contacted with equipment, product and operating personnel. The treatment zone should result in, or should be configured to, agitate the mixture of flume water and ozone to ensure intimate contact between all portions of the flume water, challenge soil load, microbial population and ozone to ensure that ozone is efficiently used to reduce microbial populations. As such the tank can contain static and dynamic agitation equipment to ensure complete contact.

As described above, the product of the ozone generator 3 is contacted either directly with the flume water in the treatment zone or with an aqueous stream 2 to produce an ozonated water stream that is contacted with the flume water in the treatment zone. In the latter method, the ozonated water can contain ozone in both a solution and gaseous phase. In the instance that excess ozone is mixed with the aqueous stream, the ozonated stream will contain greater amount of ozone than can be fully dissolved in the aqueous stream. Such ozone is carried through into the treatment zone and is combined with the flume water to result in a high, but effective concentration of ozone in the treatment zone.

EXPERIMENTAL DATA

Microbial kill studies were performed using a laboratory scale flume model designed to reproduce conditions shown in a typical flume unit as shown in FIG. 2. The laboratory tests were conducted using a 130 liter bulk tank (flume 12), containing 50 or 100 liters of flume water effluent, as a lab scaled version of the flume apparatus shown in FIG. 2. The flume water effluent was made by grinding an appropriately weighed amount of vegetable material (e.g., potato, tomato, pea) in a commercial blender, followed by 1–2 days of aging at room temperature for microbial counts to rise in the test vegetable puree. This vegetable puree was added, with constant agitation, to the bulk tank containing water and stirred to produce the flume water effluent. This mixture was circulated through a lab scale transport line 4 into the treatment zone 1 (containing the pump, static mixer, and eductor). The volume of this treatment zone 1 was approximately 0.30 liter, thus yielding a treatment zone flume water effluent volume-ratio of about 1::167–333 (0.3–0.6 continuous treatment volume). After ozone treatment, the flume water was returned to the flume via a transport line 5. An oxidation-reduction potential (ORP) probe was placed near the surface of the lab flume 12 to measure for residual aqueous ozone. An ORP value >~400 mV would indicate residual aqueous ozone not consumed in the treatment zone.

Figure 3:
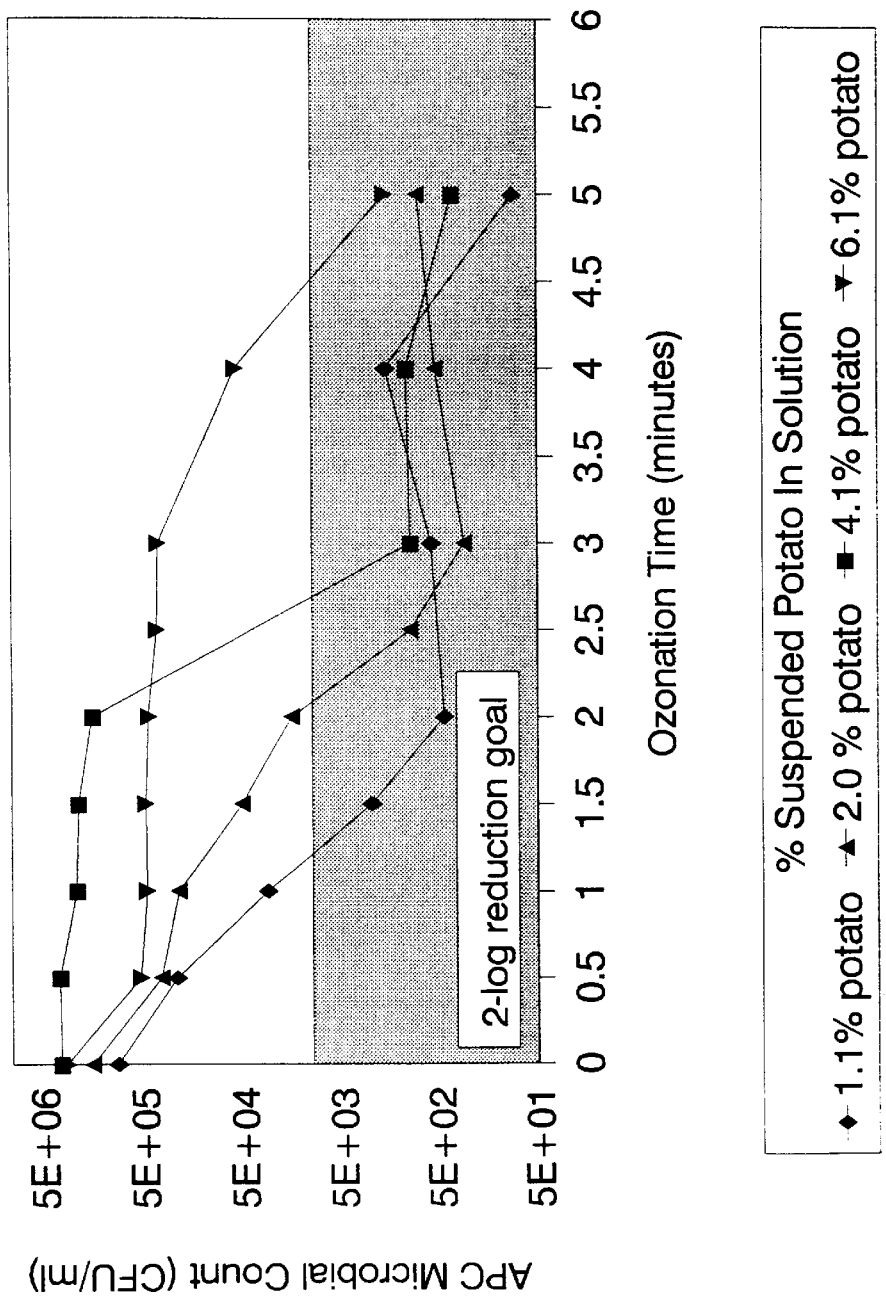
FIGS. 3–6 are graphical representations of microbial control using various proportions of ozone in an aqueous stream having challenge soil loads that range from less than 1 wt. % to greater than 6 wt. %.
Figure 4:
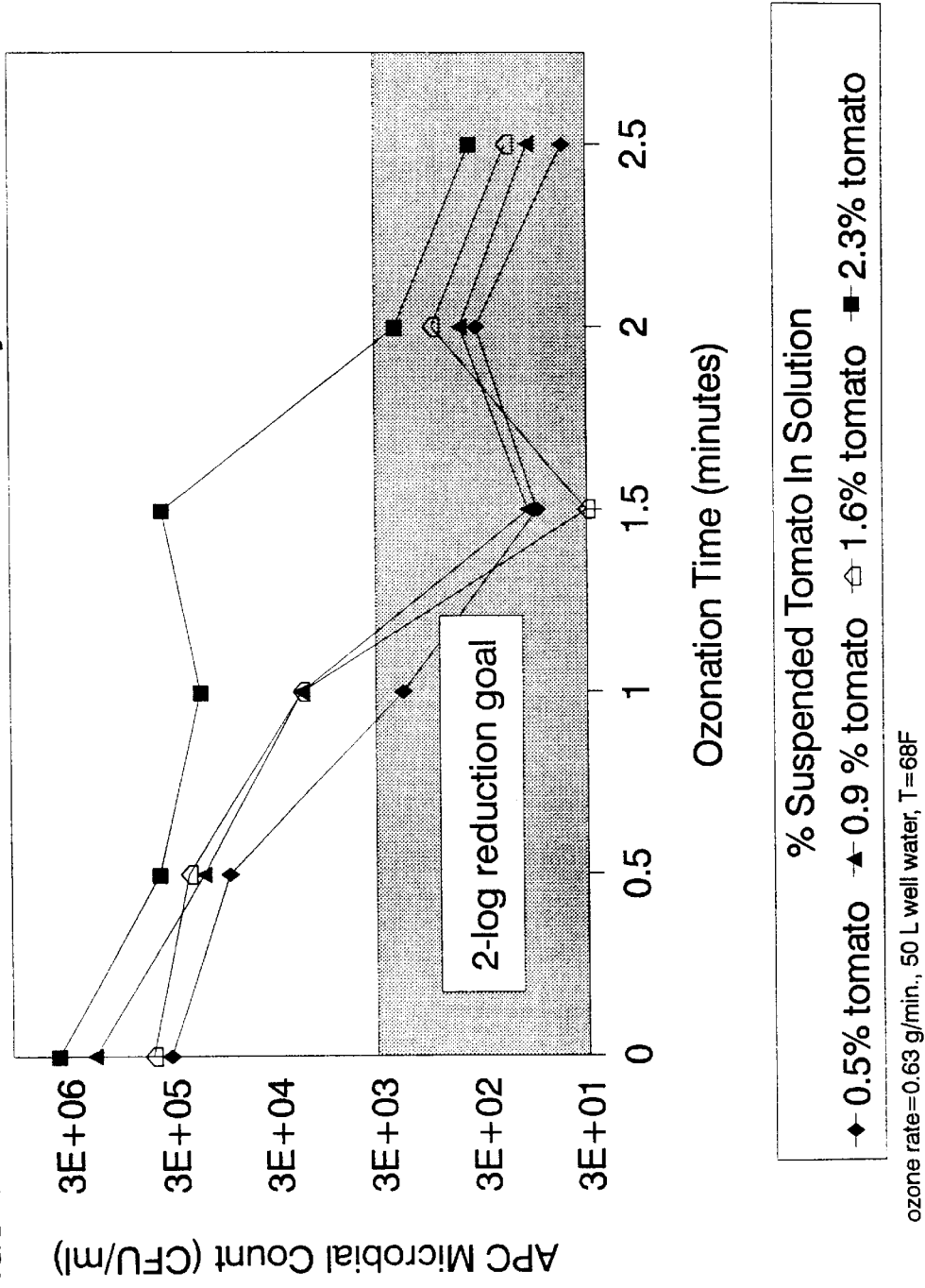
Figure 5:
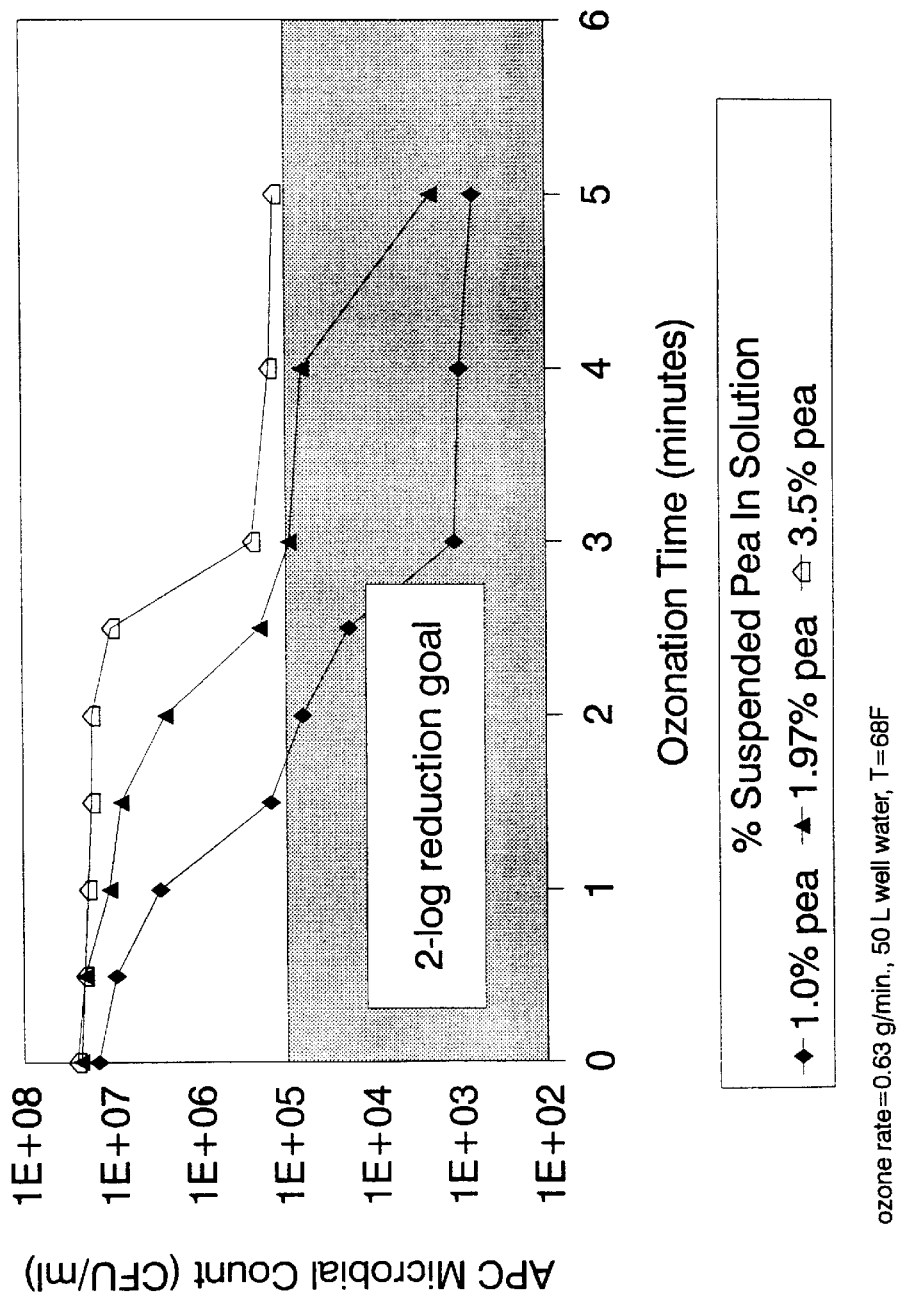

Tests were performed on transport water contaminated with a soil load prepared from three different vegetable materials; potato FIG. 3, tomato FIG. 4 and pea FIG. 5. The data obtained from these experiments, shown in FIGS. 3–5 demonstrate the effectiveness of ozone in reducing microbial levels (standard plate count, total microbial) for solutions containing ground and suspended/soluble concentrations of potatoes, tomatoes and peas. The data shows the unexpected result that greater than 2-log reduction can be achieved if a treatment zone is used, in water containing a challenged soil load; even those containing typical levels of high demand weights of vegetable matter found in commercial flume waters.

In a well mixed tank the reduction of microbial populations can achieve 100% kill in a single pass through a treatment zone when the concentration of the challenge soil load comprising potato, tomato or pea is less than 1% on the flume water volume.

Figure 6:
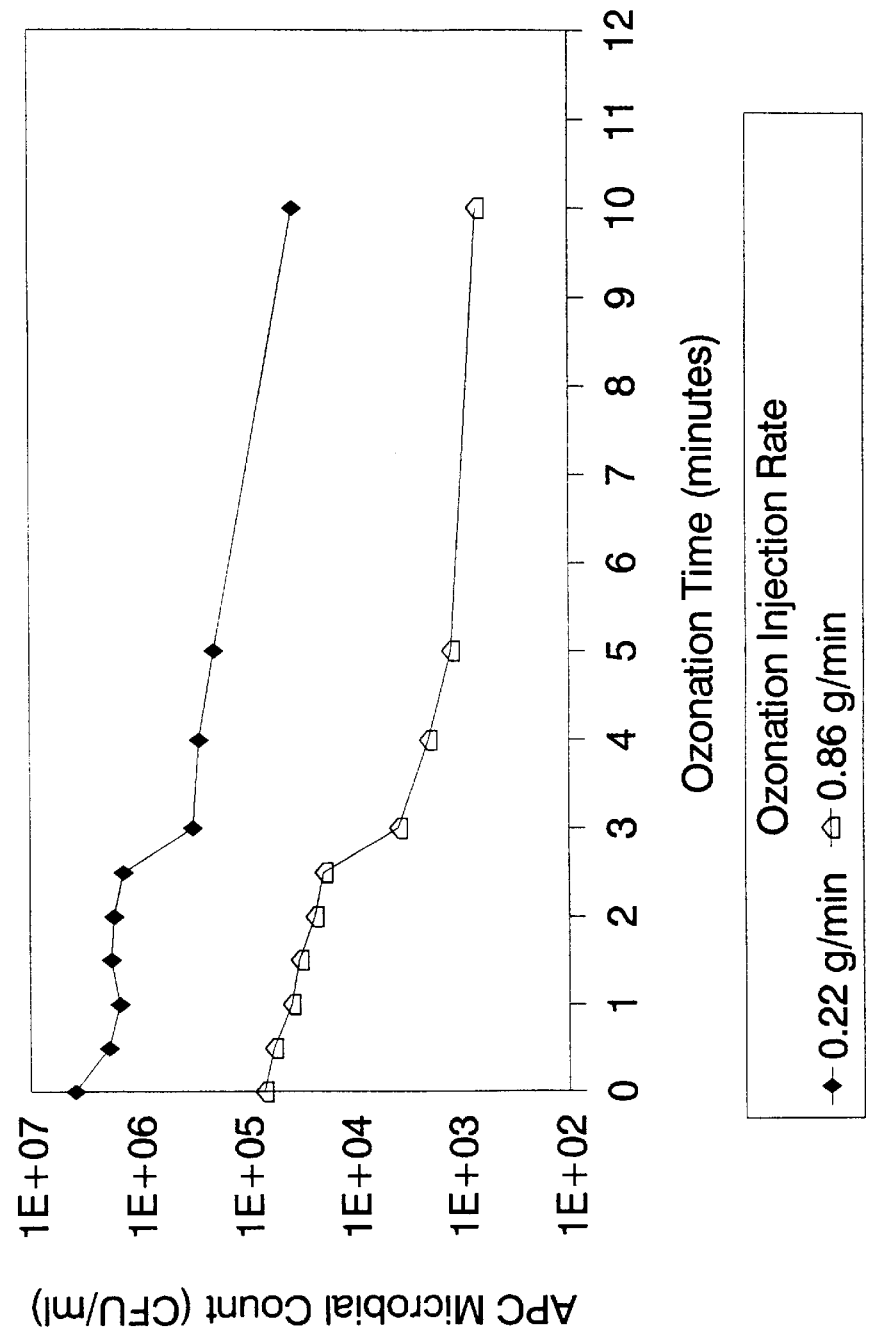

The data in FIG. 6 is an example of utilizing various ozone addition rates to effect microbial control. The results indicate that little effect in microbe reduction rate is found over a 4-fold ozonation rate. Apparently the flume microbial level is more influenced by the volume of treated vegetable effluent than by the excess ozone in the higher ozonation study where it is consumed by the vegetable matter (within the treatment zone), and is not available for additional microbe reduction in the flume system. Again, demonstrating the effect of a novel ozone treatment zone vs. the current art's bulk system treatment.

Further, the data of FIGS. 3–5 illustrate that as the loading of challenge soil increases from 1% to about 6%, the amount of ozone increases nonlinearly at a rate less than the rate of increase of soil load to obtain comparable kill results. Referring to FIG. 4, as the challenged soil load of tomato increases three-fold, the amount of ozone consumed to obtain greater than 3-log reduction of microbial populations remains relatively constant.

Figure 7:
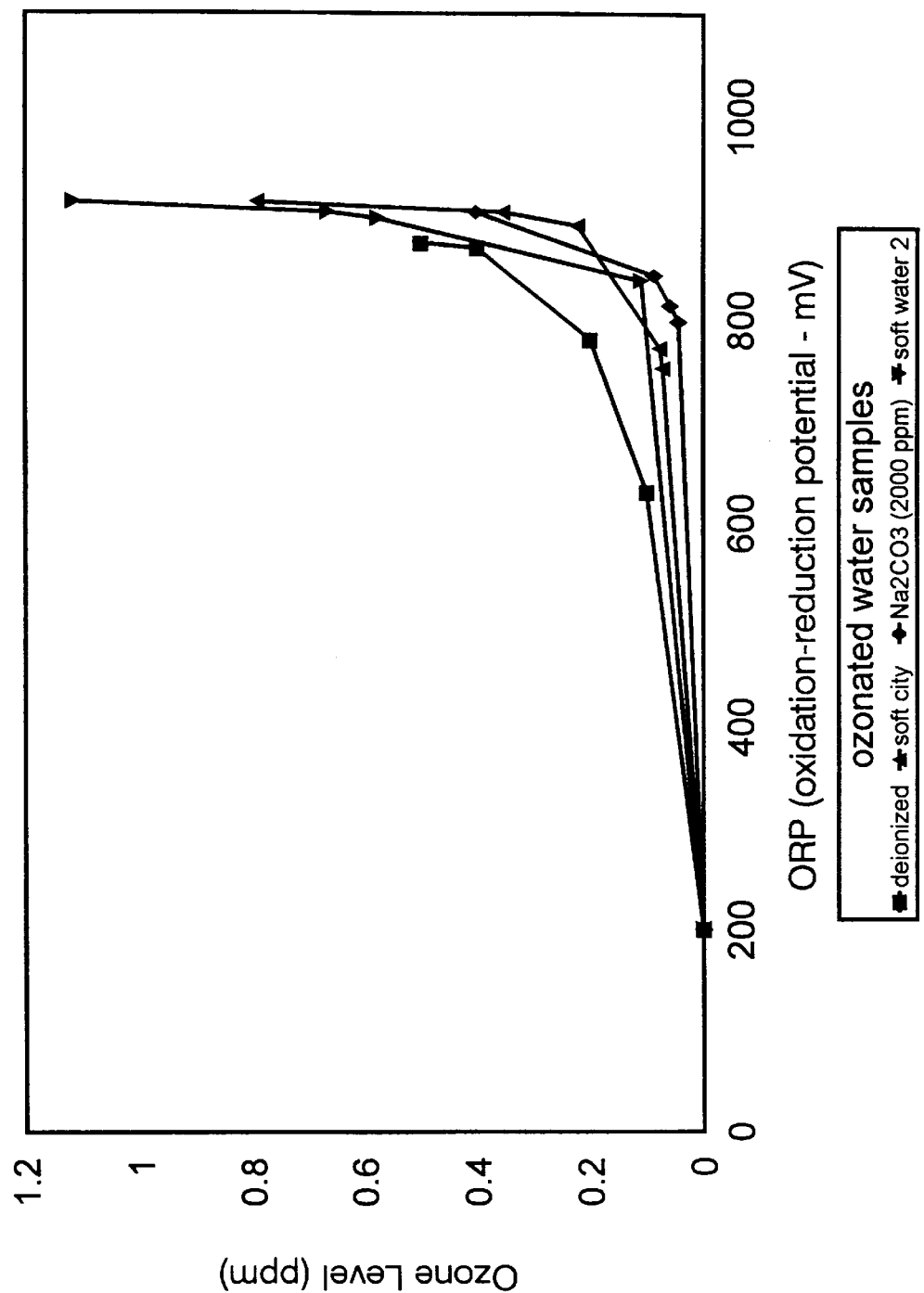
FIG. 7 is a graphical representation of qualitatively measuring ozone concentration using an oxidation-reduction probe (ORP).

In contrast to the current art which relies upon a residual aqueous ozone concentration in the flume systems for microbial control, the current method minimizes residual ozone outside the treatment zone, and all the related worker safety issues, while still allowing for microbe reductions. In the current experiments a commercially available, and routinely utilized, oxidation-reduction probe (ORP) was used in the flume tank to measure for residual aqueous ozone concentrations. FIG. 7 illustrates the relationship between ORP and aqueous ozone concentrations, with an exponential rise in ozone level for a linear increase in ORP. The figure demonstrates the usefulness of ORP for determining if residual aqueous ozone is present, as values of ~<400 mV's are deemed as negligible—and values above ~800 mV's significant for residuals.

Figure 8:
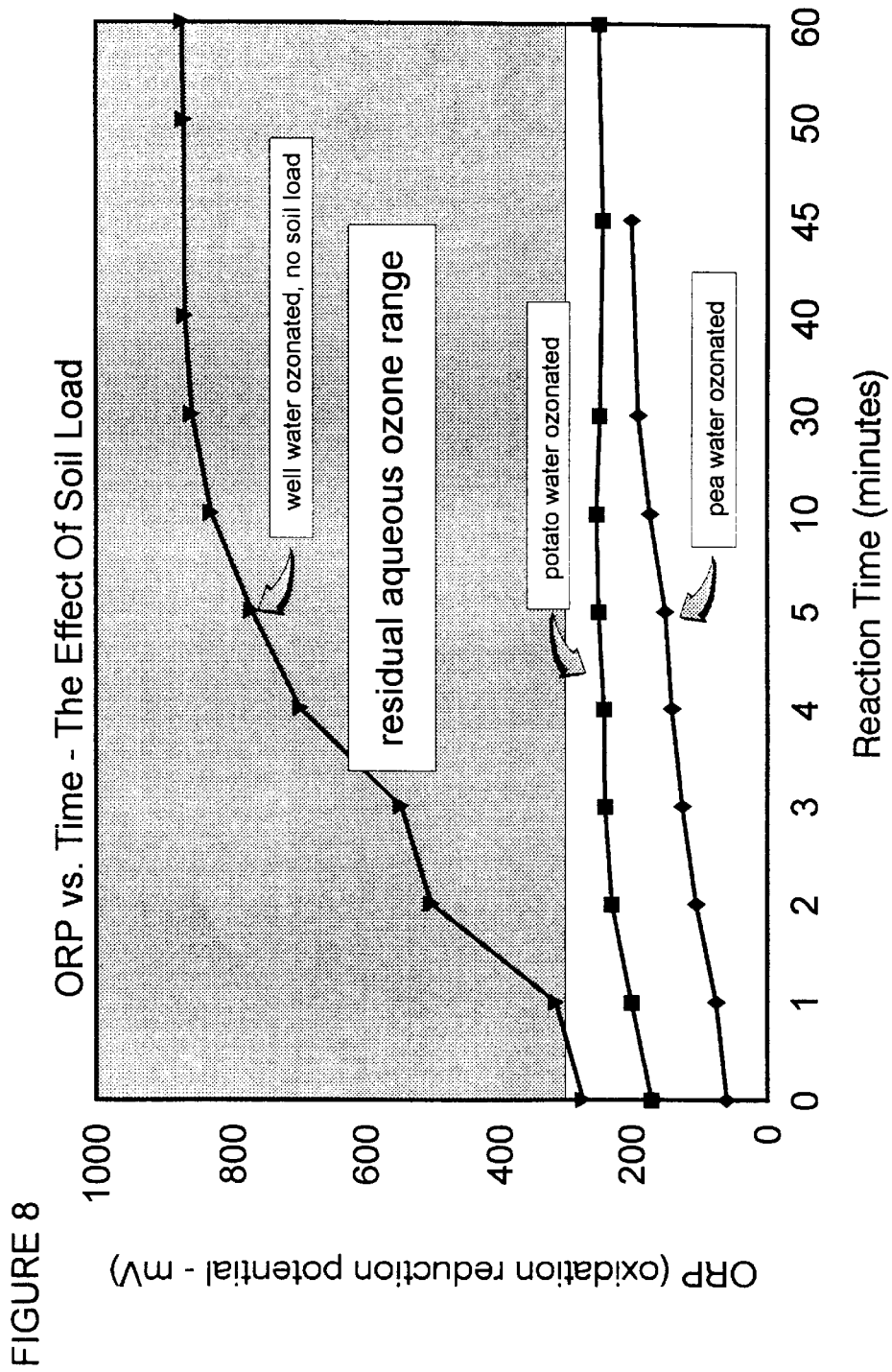
FIG. 8 is a graphical representation of using the ORP measurement to verify the absence of residual flume ozone when a vegetable soil load is present.

FIG. 8 compares a no-soil load (no vegetable matter) system treated by the current method over time and two of the vegetable loaded systems followed for microbe reduction in FIGS. 3 and 5. For the no-load system, upon ozonation, the ORP value rises from ~300 mV (no ozone at time zero) to >800 mV (substantial aqueous ozone) after 10 minutes of ozonation. Conversely when the vegetable matter is present the bulk-solution flume ORP does not rise, even after 60 minutes of ozonation, above the 300 mV mark; indicating essentially no residual aqueous ozone in the flume. Therefore, demonstrating the unique principle that the ozone can be consumed (by vegetable and microbial matter) within the treatment zone without requiring the current art's need for a residual to effect microbe control; and without offgassing exposure issues. It should be noted that an ORP measurement taken within the treatment zone (as contrasted to the aforementioned flume ORP's outside the treatment zone) rises from about 170 mV (at time=0 without ozone present) to >800 mV over the 60 minute treatment time. Thus, demonstrating the concept that within the treatment zone aqueous ozone exists, but in the flume (outside the treatment zone) no comparable ORP (or ozone level) rise is found.

The data of Table I illustrates the lack of residual ozone effects for a flume pea-effluent. The solution was ozonated for 2 minutes, the ozone removed, and microbial kill followed over time. The data shows that within the 2 minute ozonation time a microbial reduction of 1.35 log units is found in the flume, but with removal of the ozone source no additional residual reduction in microbial population occurs; i.e., microbe reduction only occurs within the treatment zone, while ozonation occurs, and no residual flume reduction occurs after its removal.

TABLE I

|  | Time (min) | Bacterial Counts (cfu/ml) |
| --- | --- | --- |
| pre ozone | 0 | $1.8 \times 10^4$ |
| ozonation time* | 0–2 | $8.0 \times 10^3$ |
| no ozone | 5 | $12.0 \times 10^3$ |
| no ozone | 10 | $8.0 \times 10^3$ |

*ozone was turned on at time = 0 min., then off at time = 2 min.

The above discussion, examples, and data illustrate our current understanding of the invention. However, since many variations of the invention can be made without departing from the spirit and scope of the invention, the invention resides wholly in the claims hereinafter appended.

We claim:

1. A method of controlling microbial growth in a continuous flowing aqueous system comprising an aqueous transport stream flowing in a closed loop from a processing locus to a production locus using a recycle stream to return the stream to the processing locus, the transport stream transporting an agricultural product from a production locus to a processing locus, the stream having a challenge soil load, the method comprising the steps of:
   (a) maintaining a treatment flow, separate from the transport stream, comprising a fraction of the aqueous transport flow, through a closed treatment zone containing a treatment volume, the transport stream having a challenge load comprising a microbial population, an inorganic and an organic soil;
   (b) contacting the treatment flow in the closed treatment zone with an effective amount of ozone, sufficient to reduce the microbial population in the treatment flow forming a treated volume; and
   (c) returning the treated volume to the aqueous stream, the treated volume having an ozone concentration less than 1 part by weight of ozone per each one million parts of the aqueous stream.

2. The method of claim 1 wherein the treatment zone is positioned in the recycle stream between the processing locus and the production locus.

3. The method of claim 1 wherein the treatment zone comprises less than about 10 vol. % of the aqueous stream.

4. The method of claim 1 wherein the effective amount of ozone in the treatment volume is about 0.5 to 50 parts of ozone per million parts of treatment flow.

5. The method of claim 1 wherein the effective amount of ozone in the treatment volume is about 1 to 20 ppm.

6. The method of claim 1 wherein the treatment volume is free of another antimicrobial composition.

7. The method of claim 1 wherein the treatment volume comprises less than about 2 vol. % of the aqueous stream.

8. The method of claim 1 wherein the treated volume comprises about 0.1 to 0.9 vol. % of the aqueous stream.

9. The method of claim 1 wherein the flow rate of the aqueous stream through the treatment zone is about 25 to 4000 liters per minute, and the treated volume is about 0.5 to 200 liters.

10. The method of claim 1 wherein the temperature of the treatment volume in the treatment zone is about 5° C. to 40° C.

11. The method of claim 1 wherein the temperature of the treatment volume in the treatment zone is about 10° C. to 30° C.

12. The method of claim 1 wherein the pH of the treatment volume is about 5.5 to 8.5.

13. The method of claim 1 wherein the concentration of ozone in the treated volume, just prior to returning the treatment volume to the aqueous system, is less than about 0.5 parts per million parts of the treated volume.

14. The method of claim 1 wherein the challenge load comprises about 0.1 to 20 wt. % of the aqueous stream.

15. The method of claim 1 wherein the challenge load comprises about 1 to 15 wt. % of the aqueous stream.

16. The method of claim 1 wherein greater than a 3-log reduction in the microbial population is achieved.

17. The method of claim 1 wherein the ozone in the treatment volume returning to the aqueous stream has an oxidation reduction potential less than about 350 mV.

18. The method of claim 1 wherein the ozone in the treatment volume returning to the aqueous stream has an oxidation reduction potential less than about 300 mV.

19. The method of claim 1 wherein ozone is directly contacted with the treatment volume.

20. The method of claim 1 wherein the ozone is contacted with water to form an aqueous ozone, and the aqueous ozone is contacted with the treated volume.

* * * * *